(12) United States Patent
Lu et al.

(10) Patent No.: US 12,265,481 B2
(45) Date of Patent: Apr. 1, 2025

(54) METHOD AND SYSTEM FOR COMMUNICATING BETWEEN APPLE MOBILE DEVICE AND APPLE PERIPHERAL

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 283 days.

(21) Appl. No.: 18/044,109

(22) PCT Filed: Nov. 23, 2021

(86) PCT No.: PCT/CN2021/132578
§ 371 (c)(1),
(2) Date: Mar. 6, 2023

(87) PCT Pub. No.: WO2022/121682
PCT Pub. Date: Jun. 16, 2022

(65) Prior Publication Data
US 2023/0315650 A1 Oct. 5, 2023

(30) Foreign Application Priority Data
Dec. 10, 2020 (CN) .......................... 202011433764.1

(51) Int. Cl.
*G06F 13/10* (2006.01)
*G06F 21/44* (2013.01)
(Continued)

(52) U.S. Cl.
CPC ............ *G06F 13/102* (2013.01); *G06F 21/44* (2013.01); *H04L 9/0825* (2013.01); *H04L 9/3265* (2013.01)

(58) Field of Classification Search
None
See application file for complete search history.

(56) References Cited

U.S. PATENT DOCUMENTS

| 8,898,349 B1* | 11/2014 | Mondal | G06F 11/00 |
| | | | 710/16 |
| 2012/0137310 A1* | 5/2012 | Teruyama | H04W 4/50 |
| | | | 719/320 |

(Continued)

FOREIGN PATENT DOCUMENTS

| CN | 102480312 A | 5/2012 |
| CN | 105933428 A | 9/2016 |

(Continued)

OTHER PUBLICATIONS

International Search Report (English translation included) and Written Opinion (Partially English translation included) issued on Jan. 11, 2022, in corresponding International Application No. PCT/CN2021/132578, 15 pages.

(Continued)

*Primary Examiner* — Taghi T Arani
*Assistant Examiner* — Joshua Raymond White
(74) *Attorney, Agent, or Firm* — Maier & Maier, PLLC

(57) ABSTRACT

A method and system for communicating between Apple mobile device and Apple peripheral. The Apple application runs a first script and sends a credential creating request to a server; when the first script receives a challenge code returned by the server, takes data to be processed as a parameter of user information and a parameter of server information to generate the user information and the server information, sets values of a first extension and a key storing identification to preset values; the Apple application generates register data and sends the register data to the Apple peripheral; the Apple peripheral obtains the data to be processed from the register data and processes the data to be (Continued)

processed, takes the obtained processing result as a second extension to generate a register response; the first script obtains the processing result from the register response.

20 Claims, 6 Drawing Sheets

(51) Int. Cl.
*H04L 9/08* (2006.01)
*H04L 9/32* (2006.01)

(56) References Cited

U.S. PATENT DOCUMENTS

2016/0292466 A1* 10/2016 Lu .................... H04L 63/0853
2019/0268042 A1    8/2019 Teruyama

FOREIGN PATENT DOCUMENTS

| CN | 108108317 A | 6/2018 |
| CN | 108885658 A | 11/2018 |
| CN | 112235421 A | 1/2021 |

OTHER PUBLICATIONS

Office Action issued on Jan. 26, 2021, in corresponding Chinese Application No. 202011433764.1, 10 pages.
Notification to Grant issued on Feb. 9, 2021, in corresponding Chinese Application No. 202011433764.1, 5 pages.

* cited by examiner

METHOD AND SYSTEM FOR COMMUNICATING BETWEEN APPLE MOBILE DEVICE AND APPLE PERIPHERAL

This application is a National Stage of International Application No. PCT/CN2021/132578, filed on Nov. 23, 2021, which claims priority to Chinese Patent Application No. 202011433764.1, filed to China National Intellectual Property Administration on Dec. 10, 2020, entitled "METHOD AND SYSTEM FOR COMMUNICATING BETWEEN APPLE MOBILE DEVICE AND APPLE PERIPHERAL", which are hereby incorporated by reference in their entireties.

TECHNICAL FIELD

The present application relates to the field of communications and, in particular, to a method and system for communicating between Apple mobile device and Apple peripheral.

BACKGROUND

In the related art, an Apple peripheral, i.e. a hardware device connected to an Apple mobile device externally, generally communicates with an Apple mobile device via Bluetooth interface or Lightning interface, of which the communication way requires that the Apple peripheral has to adapt External Accessory Framework provided by the Apple company for communication. Therefore, some Apple peripherals which do not support External Accessory Framework cannot communicate with the Apple mobile device. How to enable the Apple peripherals which do not support External Accessory Framework to communicate with the Apple mobile device become an urgent technical problem.

SUMMARY

In order to solve the defection of the related art, a method and system for communicating between Apple mobile device and Apple peripheral is provided.

In a first aspect, the present application provides a method for communicating between an Apple mobile device and an Apple peripheral, which is applied in a system including the Apple mobile device, the Apple peripheral and a server, where the Apple mobile device on which a first script is running includes an Apple application, and the method includes the following steps:

Step 101, sending, by the Apple application, a first preset webpage loading request to the server according to first user operation information;

Step 102, loading, by the server, a first preset webpage for the Apple application according to the received first preset webpage loading request, where the first preset webpage includes the first script;

Step 103, running, by the Apple application, the first script and sending a credential creating request to the server, when the first script receives a challenge code returned by the server, taking data to be processed as a parameter of user information and/or a parameter of server information generating the user information according to the parameter of the user information, generating the server information according to the parameter of the server information, setting a value of a first extension and a value of a key storing identification to preset values, and obtaining preset public key credential data;

Step 104, transferring, by the first script, the user information, the server information, the challenge code, the public key credential data, the set first extension and the set key storing identification into the Apple application;

Step 105, encapsulating, according to a data format required for calling a preset register interface, by the Apple application, the user information, the server information, the challenge code, the public key credential data, the set first extension and the set key storing identification that are transferred to obtain register data, calling the register interface, transferring the register data into the register interface, and determining whether the Apple peripheral is an authentication device according to a return value of the register interface, if yes, executing Step 106, if no, ending the procedure;

Step 106, obtaining, by the Apple peripheral, the user information, the server information, the public key credential data, the first extension and the key storing identification from the received register data, and extracting the data to be processed from the user information or the server information;

Step 107, performing, by the Apple peripheral, preset processing on the data to be processed to obtain a processing result, generating a second extension according to the processing result, setting a value of a response parameter required for generating a register response to a preset value according to the first extension and the key storing identification, encapsulating the second extension and the set response parameter according to a format required for generating authentication data to obtain a register response, and sending the register response to the first script via the preset register interface;

Step 108, parsing, by the first script, the received register response to obtain authentication data, parsing the authentication data to obtain the second extension, extracting the processing result from the second extension, and sending the processing result to the Apple application; and the method further includes: reporting, by the Apple peripheral, to the Apple application that the Apple peripheral is the authentication device when the Apple peripheral is plugged into the Apple mobile device.

In a second aspect, the present application provides a system for communicating between an Apple mobile device and an Apple peripheral, including: the Apple mobile device, the Apple peripheral and a server, where the Apple mobile device on which a first script is running includes an Apple application;

the Apple application includes a first sending module, a running module, a first encapsulating module, a first calling module and a first determining module;

the first sending module is configure to send a first preset webpage loading request to the server according to first user operation information;

the running module is configured to run the first script;

the first encapsulating module is configured to encapsulate, according to a data format required for calling a preset register interface, user information, server information, a challenge code, public key credential data, a set first extension and a set key storing identification that are transferred to obtain register data;

the first calling module is configured to call the register interface and transfer the register data into the register interface;

the first determining module is configured to determine whether the Apple peripheral is an authentication device according to a return value of the register interface;

the server is configured to load a first preset webpage according to the received first preset webpage loading request; where the first preset webpage includes the first script;

the first script includes: a second sending module, a first receiving module, a first generating module, a first setting module, a first obtaining module, a first transferring module, a first parsing module, a first extracting module and a third sending module;

the second sending module is configured to send a credential creating request to the server when the first script is run by the running module;

the first receiving module is configured to receive the challenge code returned by the server;

the first generating module is configured to, when the first receiving module receives the challenge code returned by the server, take data to be processed as a parameter of user information and/or a parameter of server information, generate the user information according to the parameter of the user information, generate the server information according to the parameter of the server information;

the first setting module is configured to set a value of a first extension and a value of a key storing identification to preset values;

the first obtaining module is configured to obtain preset public key credential data;

the first transferring module is configured to transfer the user information, the server information, the challenge code, the public key credential data, the set first extension and the set key storing identification into the Apple application;

the first parsing module is configured to parse a received register response to obtain authentication data, parse the authentication data to obtain a second extension;

the first extracting module is configured to extract a processing result from the second extension;

the third sending module is configured to send the processing result to the Apple application;

the Apple peripheral includes a second obtaining module, a processing module, a second encapsulating module and a fourth sending module;

the second obtaining module is configured to obtain the user information, the server information, the public key credential data, the first extension and the key storing identification from the received register data, and extract the data to be processed from the user information or the server information;

the processing module is configured to perform preset processing on the data to be processed to obtain the processing result;

the second encapsulating module is configured to generate the second extension according to the processing result, set a value of a response parameter required for generating the register response to a preset value according to the first extension and the key storing identification, encapsulate the second extension and the set response parameter according to a format required for generating authentication data to obtain a register response;

the fourth sending module is configured to send the register response to the first script via the preset register interface;

the Apple peripheral further includes a reporting module;

the reporting module is configured to report to the Apple application that a device type is authentication device when the Apple peripheral is plugged into the Apple mobile device.

In a third aspect, the present application provides another system for communicating between an Apple mobile device and an Apple peripheral, including: the Apple mobile device, the Apple peripheral and a server, where the Apple mobile device on which a first script is running includes an Apple application;

the Apple mobile device includes a first transmitter and a first processor;

the first transmitter is configured to send a first preset webpage loading request to the server according to first user operation information;

the first processor is configured to run the first script;

the first processor is further configured to encapsulate, according to a data format required for calling a preset register interface, user information, server information, a challenge code, public key credential data, a set first extension and a set key storing identification that are transferred to obtain register data;

the first processor is further configured to call the register interface and transfer the register data into the register interface;

the first processor is further configured to determine whether the Apple peripheral is an authentication device according to a return value of the register interface;

the server is configured to load a first preset webpage according to the received first preset webpage loading request, where the first preset webpage includes the first script;

the first transmitter is further configured to send a credential creating request to the server when the first script is run by the first processor;

the Apple mobile device further includes a first receiver, configured to receive the challenge code returned by the server;

the first processor is further configured to, when the first receiver receives the challenge code returned by the server, take data to be processed as a parameter of user information and/or a parameter of server information, generate the user information according to the parameter of the user information, and generate the server information according to the parameter of the server information;

the first processor is further configured to set a value of a first extension and a value of a key storing identification to preset values;

the first processor is further configured to obtain preset public key credential data;

the first processor is further configured to transfer the user information, the server information, the challenge code, the public key credential data, the set first extension and the set key storing identification into the Apple application;

the first processor is further configured to parse a received register response to obtain authentication data, parse the authentication data to obtain a second extension;

the first processor is further configured to extract a processing result from the second extension;

the first processor is further configured to send the processing result to the Apple application;

the Apple peripheral includes a second receiver and a second processor;

the second receiver is configured to receive the register data;

the second processor is configured to obtain the user information, the server information, the public key credential data, the first extension and the key storing identification from the register data, and extract the data to be processed from the user information or the server information;

the second processor is further configured to perform preset processing on the data to be processed to obtain the processing result;

the second processor is further configured to generate the second extension according to the processing result, set a value of a response parameter required for generating the register response to a preset value according to the first extension and the key storing identification, encapsulate the second extension and the set response parameter according to a format required for generating authentication data to obtain the register response;

the Apple peripheral further includes a second transmitter;

the second transmitter is configured to send the register response to the first script via running in the Apple mobile device the preset register interface; and the second transmitter is further configured to report to the Apple application that the Apple peripheral is the authentication device when the Apple peripheral is plugged into the Apple mobile device.

Comparing to the related art, the present application has at least the following advantage:

the present application provides a system for communicating between an Apple mobile device and an Apple peripheral, which realizes that an Apple peripheral which does not support the External Accessory Framework protocol can communicate with an Apple mobile device.

DETAILED DESCRIPTION OF THE EMBODIMENTS

Figure 1:
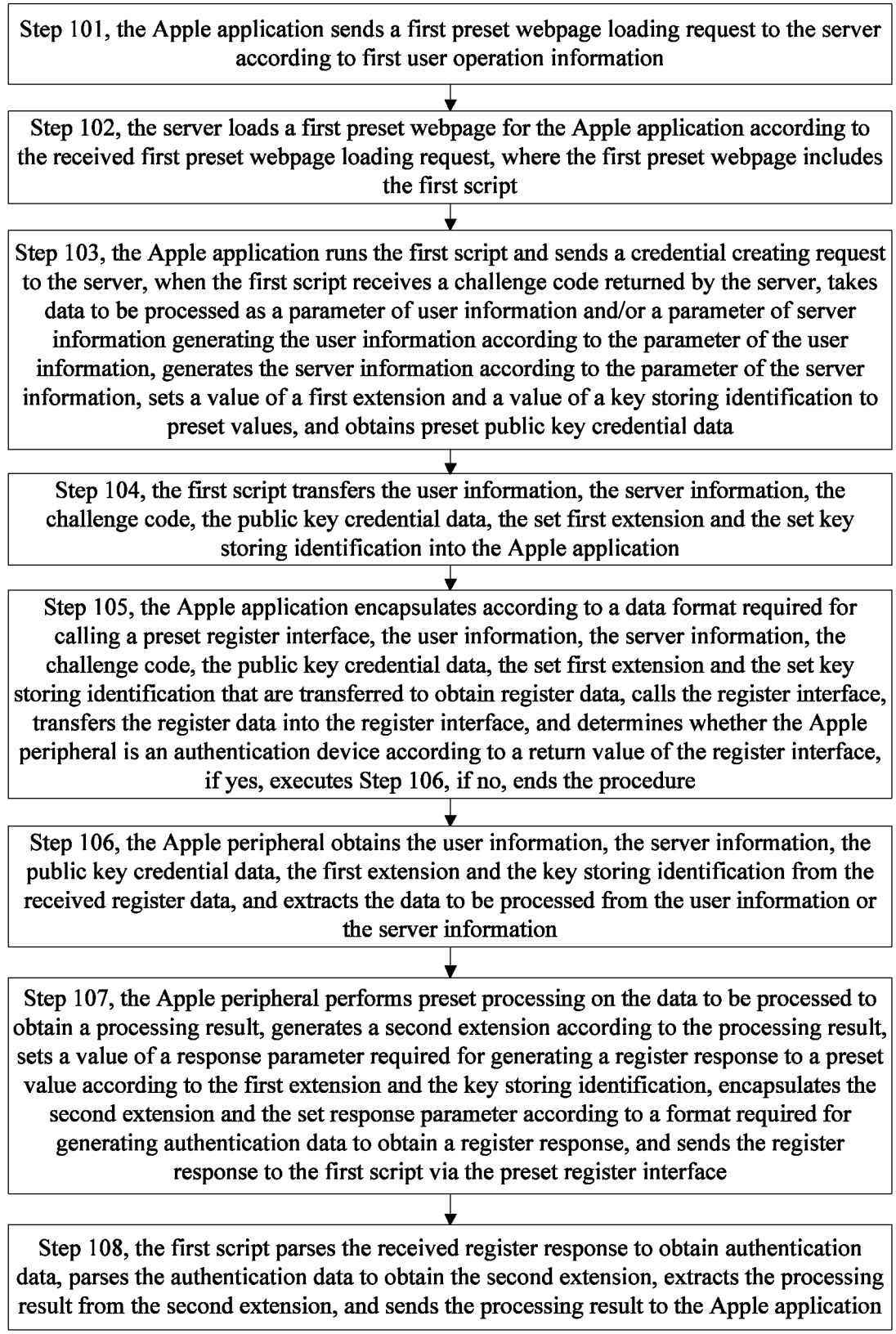
FIG. 1 is a flow chart of a method for communicating between an Apple mobile device and an Apple peripheral provided by Embodiment 1 of the present application.
Figure 2A:
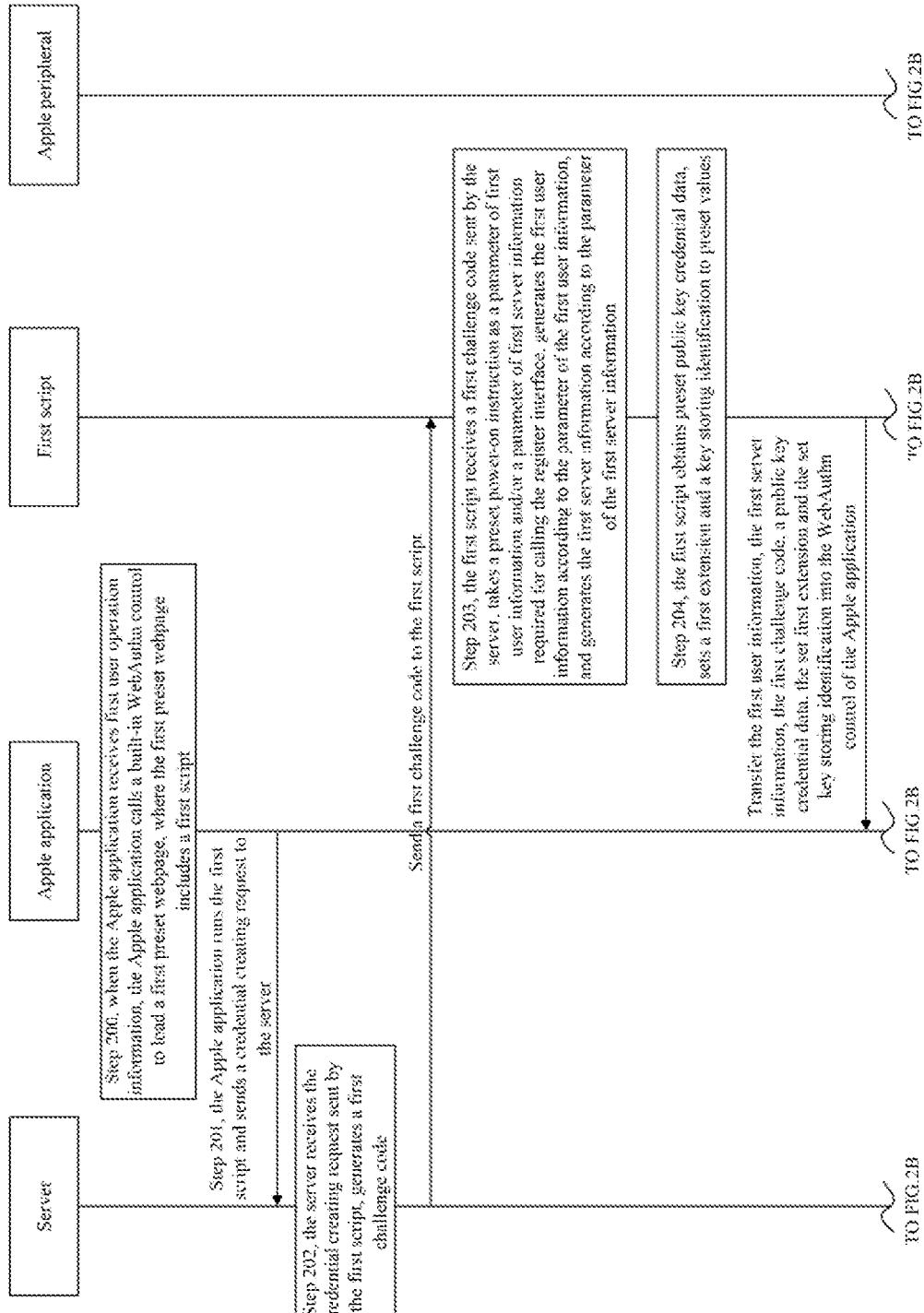
FIG. 2A, FIG. 2B, FIG. 2C and FIG. 2D show a flow chart of a method for communicating between an Apple mobile device and an Apple peripheral provided by Embodiment 2 of the present application.
Figure 2B:
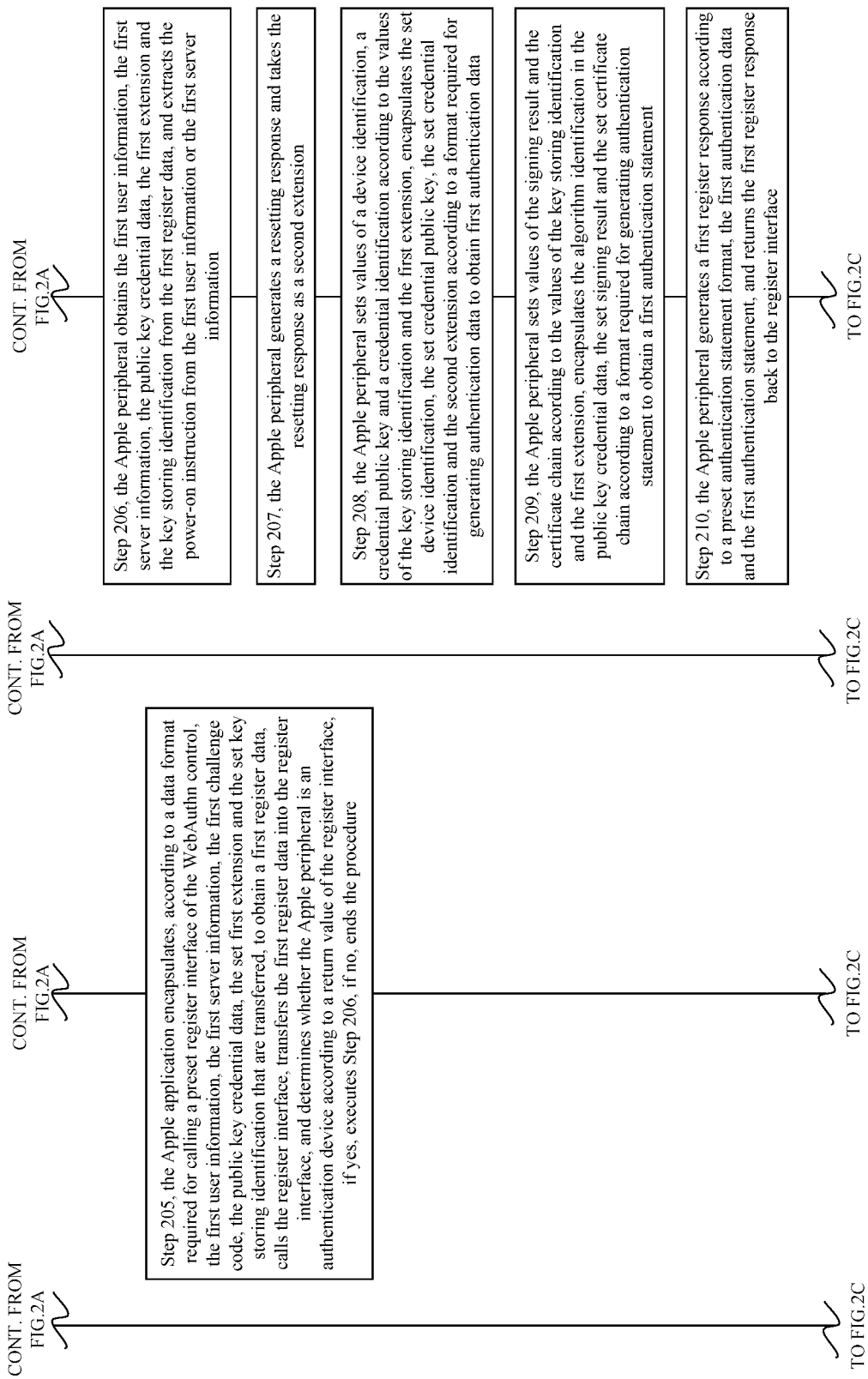
Figure 2C:
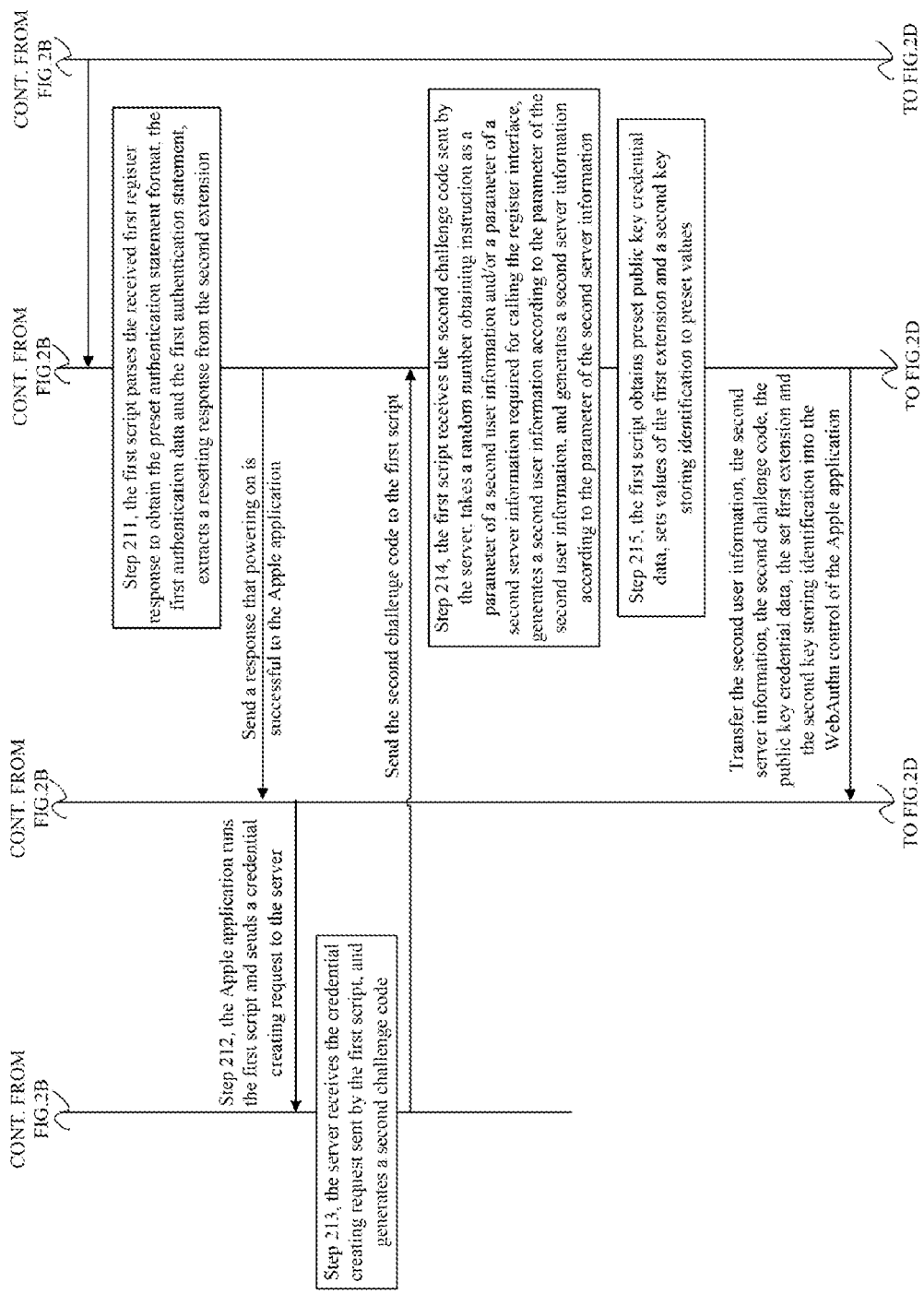
Figure 2D:
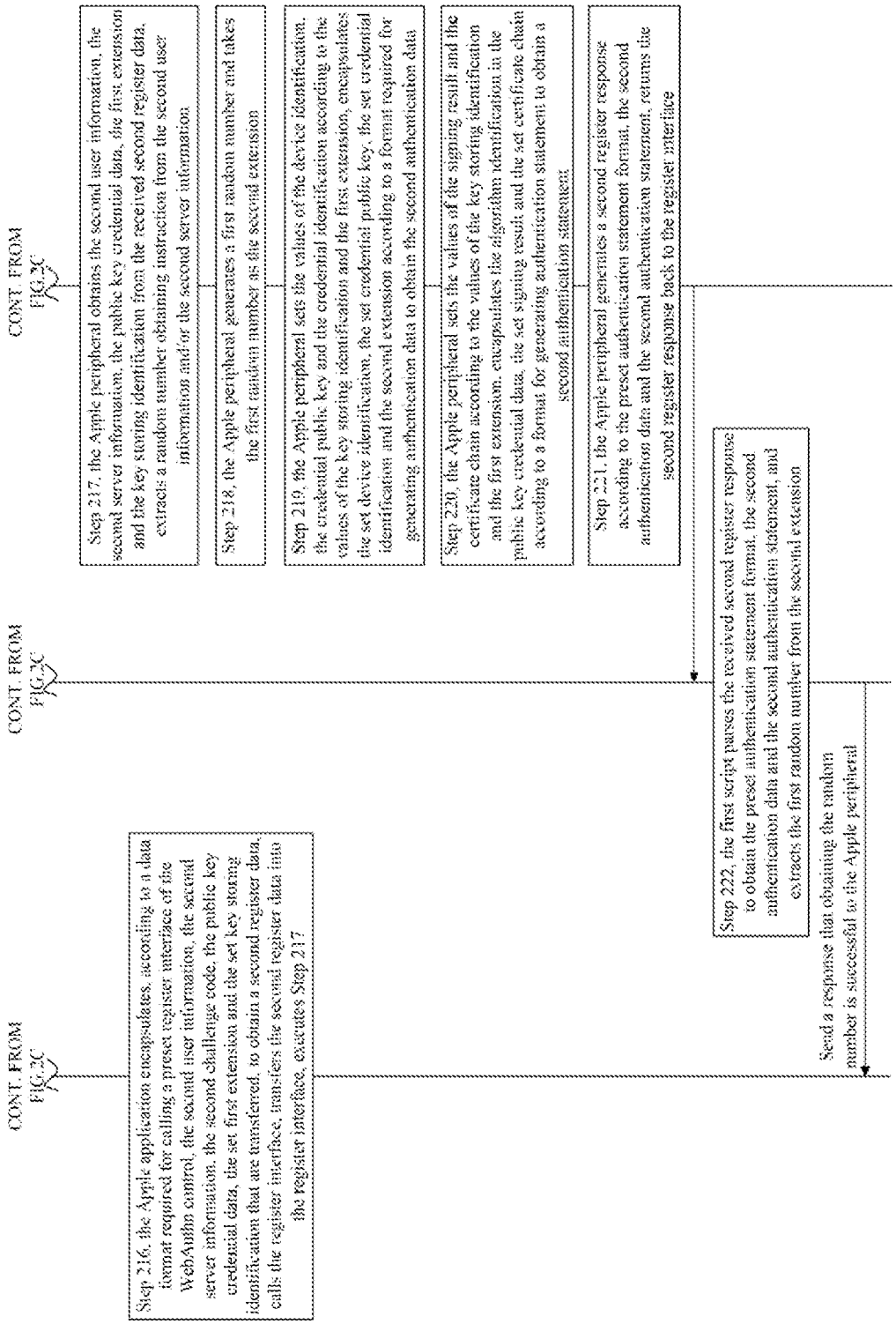

The present application provides a method for communicating between an Apple mobile device and an Apple peripheral. Reference will now be made in detail embodiments of the application examples of which are illustrated in the accompanying drawings. The embodiments referring the drawing are examples of the present application and is used to explain the present application. However, it should be understood that the present application is not limited to specific disclosed embodiments.

Unless otherwise defined, all terms used here (including technical terms and scientific terms) have the same meaning as would be commonly understood by ordinary technical personnel in the field to which the present application belongs. It should also be understood that terms, such as those defined in general purpose dictionaries, should be understood to have a meaning consistent with the meaning in the context in the related art, and should not to be interpreted in idealized or overly formal terms unless specifically defined as here.

In order to make the purpose of this application, technical solution and advantage are more clear, the implementations of the present application is further described in detail in combination with the attached drawings.

It should be noted that Web Authentication API (WebAuthn for short) is a set of application interfaces for completing registering authentication. The register interface involved in the present embodiment is WebAuthn interface.

Embodiment 1

Embodiment 1 of the present application provides a method for communicating between an Apple mobile device and an Apple peripheral, which is applied in a system including the Apple mobile device, the Apple peripheral and a server, where the Apple mobile device on which a first script is running includes an Apple application, and the method includes the following steps:

Step 101, the Apple application sends a first preset webpage loading request to the server according to first user operation information;

Step 102, the server loads a first preset webpage for the Apple application according to the received first preset webpage loading request, where the first preset webpage includes the first script;

Step 103, the Apple application runs the first script and sends a credential creating request to the server, when the first script receives a challenge code returned by the server, takes data to be processed as a parameter of user information and/or a parameter of server information generating the user information according to the parameter of the user information, generates the server information according to the parameter of the server information, sets a value of a first extension and a value of a key storing identification to preset values, and obtains preset public key credential data;

Step 104, the first script transfers the user information, the server information, the challenge code, the public key credential data, the set first extension and the set key storing identification into the Apple application;

Step 105, the Apple application encapsulates according to a data format required for calling a preset register interface, the user information, the server information, the challenge code, the public key credential data, the set first extension and the set key storing identification that are transferred to obtain register data, calls the register interface, transfers the register data into the register interface, and determines whether the Apple peripheral is an authentication device according to a return value of the register interface, if yes, executes Step 106, if no, ends the procedure;

Step 106, the Apple peripheral obtains the user information, the server information, the public key credential data, the first extension and the key storing identification from the received register data, and extracts the data to be processed from the user information or the server information;

Step 107, the Apple peripheral performs preset processing on the data to be processed to obtain a processing result, generates a second extension according to the processing result, sets a value of a response parameter required for generating a register response to a preset value according to the first extension and the key storing identification, encapsulates the second extension and the set response parameter according to a format required for generating authentication data to obtain a register response, and sends the register response to the first script via the preset register interface;

Step 108, the first script parses the received register response to obtain authentication data, parses the authentication data to obtain the second extension, extracts the processing result from the second extension, and sends the processing result to the Apple application;

the method further includes: the Apple peripheral reports to the Apple application that the Apple peripheral is the authentication device when the Apple peripheral is plugged into the Apple mobile device.

In an implementation, Step 101 specifically is: the Apple application calls a built-in WebAuthn control according to the first user operation information to send the first preset webpage loading request to the server.

In an implementation, Step 104 specifically is: the first script calls the built-in WebAuthn control of the Apple application, and transfers the user information, the server information, the challenge code, the public key credential data, the set first extension and the set key storing identification into a preset register interface of the WebAuthn control.

In an implementation, the determining whether the Apple peripheral is the authentication device according to the return value of the register interface in Step 105 specifically is: the Apple application determines whether a parameter returned by the register interface is a first preset value, if yes, determines that the Apple peripheral is the authentication device, otherwise, determines that the Apple peripheral is not the authentication device.

In an implementation, the user information includes a user identity (ID) parameter, a user icon parameter, a user name parameter and a user display name parameter, and the server information includes a server ID parameter and a server name parameter;

the taking the data to be processed as the parameter of the user information and/or the parameter of the server information, generating the user information according to the parameter of the user information, and generating the server information according to the parameter of the server information in Step 103 specifically is: the first script takes the data to be processed as the user name parameter or the user display name parameter or the server name parameter, generates the user information according to the user ID parameter, the user icon parameter, the user name parameter and the user display name parameter, and generates the server information according to the server ID parameter and the server name parameter.

In an implementation, the setting the value of the first extension and the value of the key storing identification to the preset values in Step 103 specifically is: the first script sets the value of the first extension to none and sets the value of the key storing identification to false;

the generating the second extension according to the processing result, setting the value of the response parameter required for generating the register response to the preset value according to the first extension and the key storing identification, and encapsulating the second extension and the set response parameter according to the format required for generating the authentication data to obtain the register response in Step 107 specifically is:

Step b1, the Apple peripheral takes the processing result as the second extension;

Step b2, the Apple peripheral sets values of a device identification, a credential public key and a credential identification which are required for generating the authentication data to null, encapsulating the set device identification, the set credential public key, the set credential identification and the second extension according to a format required for generating the authentication data to obtain the authentication data;

Step b3, the Apple peripheral sets values of a public key credential data, a signing result and a certificate chain which are required for generating an authentication statement to null, encapsulates the set public key credential data, the set signing result and the set certificate chain according to a format required for generating the authentication statement to obtain the authentication statement; and Step b4, the Apple peripheral encapsulates a preset authentication statement format, the authentication data and the authentication statement according to a format needed for generating the register response to obtain the register response.

In an implementation, the setting the value of the first extension and the value of the key storing identification to preset values in Step 103 specifically is: the first script sets the value of the first extension to null, and sets the value of the key storing identification to false, and the register data further includes a client data hash value;

the generating the second extension according to the processing result, setting the value of the response parameter required for generating the register response to the preset value according to the first extension and the key storing identification, and encapsulating the second extension and the set response parameter according to the format required for generating the authentication data to obtain the register response in Step 107 specifically is:

Step c1, the Apple peripheral takes the processing result as the second extension;

Step c2, the Apple peripheral generates a credential key pair and a first credential identification, obtains a preset device identification, respectively sets a value of a device identification, a value of a credential public key and a value of a credential identification which are required for generating the authentication data to the first credential identification, a public key in the credential key pair and the preset device identification, and encapsulates the set device identification, the set credential public key, the set credential identification and the second extension according to a format required for generating the authentication data to obtain the authentication data;

Step c3, the Apple peripheral uses a stored device private key to sign the client data hash value and the obtained authentication data to obtain a first signing result, obtains a device preset certificate chain, respectively sets a value of public key credential data, a value of a signing result and a value of a certificate chain which are required for generating an authentication statement to the public key credential data, the first signing result and the preset certificate chain in the register data, and encapsulates the set public key credential data, the set signing result and the set preset certificate chain according to a format required for generating the authentication statement to obtain the authentication statement; and Step c4, the Apple peripheral encapsulates a preset authentication statement format, the authentication data and the authentication statement according to a format required for generating the register response to generate the register response.

In an implementation, the encapsulating the set device identification, the set credential public key, the set credential identification and the second extension according to the format required for generating the authentication data to obtain the authentication data specifically is: the Apple peripheral concatenates the set device identification, the set credential public key, the set credential identification and the second extension in sequence to obtain the authentication data;

the encapsulating the set public key credential data, the set signing result and the set preset certificate chain according to the format required for generating the authentication statement to obtain the authentication statement specifically is: the Apple peripheral concatenates the set public key credential data, the set signing result and the set certificate chain in sequence to obtain the authentication statement; and the Apple peripheral encapsulates the preset authentication statement format, the authentication data and the authentication statement according to the format required for generating the register response to generate the register response specifically is: the Apple peripheral concatenates the preset authentication statement format, the authentication data and the authentication statement in sequence to obtain the register response.

In an implementation, the data to be processed specifically is a power-on instruction; the Apple peripheral performs the preset processing on the data to be processed to obtain the processing result in Step 107 specifically is: the Apple peripheral generates a reset response according to the power-on instruction.

In an implementation, the data to be processed specifically is a random number obtaining instruction; the Apple peripheral performs the preset processing on the data to be processed to obtain the processing result in Step 107 specifically is: the Apple peripheral generates a first random number according to the random number obtaining instruction.

The present embodiment provides a method for communicating between an Apple mobile device and an Apple peripheral, which realizes that an Apple peripheral which does not support the External Accessory Framework protocol can communicate with an Apple mobile device.

Embodiment 2

The present application provides a method for communicating between an Apple mobile device and an Apple peripheral, which is applied in a system including the Apple mobile device, the Apple peripheral and a server, where the Apple mobile device on which a first script is running includes an Apple application, a WebAuthn control is embedded in the Apple application, the WebAuthn control includes a register interface (also referred as WebAuthn interface), the Apple peripheral and the register interface are compatible. As shown by FIG. 2A, FIG. 2B, FIG. 2C and FIG. 2D, the method includes following steps.

Step 200, when the Apple application receives first user operation information, the Apple application calls a built-in WebAuthn control to load a first preset webpage, where the first preset webpage includes a first script.

In an implementation, Step 200 specifically is: when an Apple application is clicked by a user, the Apple application displays a first user operation interface, waits for receiving the first user operation information which is generated by a user clicking a preset button in the first user operation interface; when the Apple application receives the first user operation information, the Apple application calls the WebAuthn control to load a first preset webpage.

In an implementation, the calling the WebAuthn control to load the first preset webpage includes: when the Apple application calls the WebAuthn control to load the first preset webpage, the WebAuthn control triggers a system to pop up a user authorization box; the system waits for receiving the user's authorization information for loading the first preset webpage; when the system receives the authorization information, the WebAuthn control is called to load the first preset webpage.

In an implementation, when the system is iOS10, iOS11 or iOS12, the WebAuthn control called by the Apple application is ASWebAuthenticationSession *authenticationVC.

In an implementation, when the system is iOS13.0 or above, the WebAuthn control called by the Apple application is authenticationVC; before calling the WebAuthn control to load the first preset webpage, further including: the Apple application sets a proxy call back function for the WebAuthn control. The invoking the WebAuthn control to load a first preset webpage specifically is: the Apple application calls the authenticationVC control to load the first preset webpage, the WebAuthn control triggers a system to pop up a user authorization box; the system waits for receiving the user's authorization information for loading the first preset webpage; when the system receives the authorization information, the WebAuthn control is called to load the first preset webpage, and the proxy callback function is called back to send a response that calling the WebAuthn control is successful to the Apple application.

For example, the proxy callback function set by the Apple application for the WebAuthn control specifically is: authenticationVC.presentationContextProvider=self; when the Apple application calls [self.authenticationVC start], the system will pop up a user authorization box.

For example, the WebAuthn control is: ASWebAuthenticationSession *authenticationVC=[[ASWebAuthenticationSession alloc] initWithURL:requestURL callbackURLScheme:redirectScheme completionHandler:^(NSURL*_Nullable callbackURL, NSError*_Nullable error){ }].

Step 201, the Apple application runs the first script and sends a credential creating request to the server.

In an implementation, Step 201 specifically is: the Apple application runs the first script to execute the onload method and sends a credential creating request to the server.

Step 202, the server receives the credential creating request sent by the first script, generates a first challenge code and sends a first challenge code to the first script.

For example, the first challenge code is:
h'687134968222EC17202E42505F8ED2B16AE22F16B B05B88C25DB9 E602645F141'.

Step 203, the first script receives a first challenge code sent by the server, takes a preset power-on instruction as a parameter of first user information and/or a parameter of first server information required for calling the register interface, generates the first user information according to the parameter of the first user information, and generates the first server information according to the parameter of the first server information.

In an implementation, the parameter of the first user information includes a user ID parameter, a user icon parameter, a user name parameter and a user display name parameter; the taking the preset power-on instruction as the parameter of the first user information and/or the parameter of the first server information required for calling the register interface specifically is: the first script takes the power-on instruction as the user name parameter or the user display name parameter of the first user information.

In an implementation, the parameter of the first server information includes a server ID parameter and a server name parameter; the taking the preset power-on instruction as the parameter of the first user information and/or the parameter of the first server information required for calling the register interface specifically is: the first script takes the power-on instruction as the server name parameter of the first server information.

For example, the power-on instruction specifically is: "powerOn".

The first user information specifically is:
{"id": h'03AC674216F3E15C761EE1A5E255F067953623C8B388B4459E13F978D7C846F4', "icon": "https://example.com/userIcon.png", "name": "powerOn", "displayName": "Command"}.

Step 204, the first script obtains preset public key credential data, sets a first extension and a key storing identification to preset values, transfers the first user information, the first server information, the first challenge code, a public key credential data, the set first extension and the set key storing identification into the WebAuthn control of the Apple application.

In an implementation, the setting the first extension and the key storing identification to preset values specifically is: the first script sets a first extension to none and sets the key storing identification to false.

Further, the first extension specifically is attestation; when the first script sets the attestation to none, the first script will not verify a certificate chain and a signing result in a register response returned by the Apple peripheral, the Apple peripheral can set the certificate chain and the signing result to null.

Further, the key storing identification specifically is rk; when the first script sets the value of the rk to false, the first script will not verify a credential public key in the register response returned by the Apple peripheral, the Apple peripheral can set the credential public key to null.

In an implementation, the setting the first extension and the key storing identification to preset values specifically is: the first script sets the first extension to null and sets the key storing identification to false.

Further, the first extension specifically is attestation; when the first script sets the attestation to null, the first script will verify a certificate chain and a signing result in a register response returned by the Apple peripheral, the Apple peripheral cannot set the certificate chain and the signing result to null.

Further, the key storing identification specifically is rk; when the first script sets the value of the rk to false, the first script will not verify a credential public key in the register response returned by the Apple peripheral, the Apple peripheral can set the credential public key to null.

Step 205, the Apple application encapsulates, according to a data format required for calling a preset register interface of the WebAuthn control, the first user information, the first server information, the first challenge code, the public key credential data, the set first extension and the set key storing identification that are transferred, to obtain a first register data, calls the register interface, transfers the first register data into the register interface, and determines whether the Apple peripheral is an authentication device according to a return value of the register interface, if yes, executes Step 206, if no, ends the procedure.

In an implementation, the method further includes: the Apple peripheral reports to the Apple application that the Apple peripheral is the authentication device when the Apple peripheral is plugged into the Apple mobile device.

In an implementation, the Apple mobile device specifically is iPad Pro.

In an implementation, the authentication device specifically is fido device.

In an implementation, the Apple application encapsulates, according to a data format required for calling a preset register interface of the WebAuthn control, the first user information, the first server information, the first challenge code, the public key credential data, the set first extension and the set key storing identification that are transferred, to obtain the first register data specifically is: the Apple application concatenates the first user information, the first server information, the first challenge code, the public key credential data, the set first extension and the set key storing identification in sequence to obtain a first register data.

In an implementation, the public key credential data specifically includes a signing algorithm identification and credential type.

In an implementation, the first user information specifically is: {"id":h'03AC674216F3E15C761EE1A5E255F067953623C8B388B4459E13F978D7C846F4', "icon": "https://example.com/userIcon.png", "name": "powerOn", "displayName": "Command"}.

The first server information specifically is: {"id": "ftsafe@ftsafe.com", "name": "ftsafe@ftsafe.com"}.

The public key credential data specifically is [{"alg": −7, "type",: "public-key"}].

The first extension specifically is: {attestation: "none"}.

The key storing identification specifically is: {"rk": false}}.

Step 206, the Apple peripheral obtains the first user information, the first server information, the public key credential data, the first extension and the key storing identification from the first register data, and extracts the power-on instruction from the first user information or the first server information.

Step 207, the Apple peripheral generates a resetting response and takes the resetting response as a second extension.

For example, the resetting response specifically is: 3B9F958131FE9F0066465305200325 71DF000001000020.

Step 208, the Apple peripheral sets values of a device identification, a credential public key and a credential identification according to the values of the key storing identification and the first extension, encapsulates the set device identification, the set credential public key, the set credential identification and the second extension according to a format required for generating authentication data to obtain first authentication data.

In an implementation, the value of the key storing identification specifically is false, the value of the first extension specifically is none.

Step 208 specifically is: the Apple application sets the value of the device identification, the credential public key and the credential identification to null, concatenates the set device identification, the set credential key, the set credential identification and the second extension in sequence to obtain the first authentication data.

For example, the first authentication data specifically is: h'E45329D03A2068D1CAF7F7BB0AE954E6B0E6259 745F32F4829F75 0F05011F9C2C5000007983E 22415D7FDF4EA48A0CDD60C4249B9D006070787 5 A0708465A419F601E1E143D1F184674F916CF0 12A825881AD6FB095EC3C13B9 79060DACA8632C43BCCC27E7FCFE190AB4B605 60DD7E51D542889FB1A51D 51261F03FF9A1AAD2D7BD260F23232BB6A5B30 68E47D9541EB7169F78769D0D 83B9F958131FE9F006646530520032571DF0000010 00020'.

Step 209, the Apple peripheral sets values of the signing result and the certificate chain according to the values of the key storing identification and the first extension, encapsulates the algorithm identification in the public key credential data, the set signing result and the set certificate chain according to a format required for generating authentication statement to obtain a first authentication statement.

In an implementation, the value of the key storing identification specifically is false, the value of the first extension specifically is none.

Step 209 specifically is: the Apple peripheral sets the values of the signing result and the certificate to null, concatenates the algorithm identification in the public key credential data, the set signing result and the set certificate chain in sequence to obtain a first authentication statement.

For example, the signing algorithm identification specifically is: alg": –7.

The preset signing result specifically is: "sig": h".

The preset certificate chain specifically is: "x5c": [h"].

The first authentication statement specifically is: {"alg": –7, "sig": h", "x5c": [h"]}.

Step 210, the Apple peripheral generates a first register response according to a preset authentication statement format, the first authentication data and the first authentication statement, and returns the first register response back to the register interface.

In an implementation, after Step 210, the method further includes: the WebAuthn control sends the first register response returned by the register interface to the first script.

For example, the preset authentication statement format specifically is: "packed".

The first register response specifically is: {1: "packed", 2: h'E45329D03A2068D1CAF7F7BB0AE954E6B0E625974 5F32F4829F750F05011F9 C2C5000007983E22415D7FDF4EA48A0CDD60C4249B 9D0060707875A0708465 A419F601E1E143D1F184674F916CF012A825881AD6F B095EC3C13B979060DA CA8632C43BCCC27E7FCFE190AB4B60560DD7E51D5 42889FB1A51D51261F03 F9A1AAD2D7BD260F23232BB6A5B3068E47D9541EB7 169F78769D0D83B9F95 8131FE9F006646530520032571DF000001000020',3: {"alg": –7, "sig": h", "x5c": [h"]}}.

Step 211, the first script parses the received first register response to obtain the preset authentication statement format, the first authentication data and the first authentication statement, extracts a resetting response from the second extension, and sends a response that powering on is successful to the Apple application.

Step 212, the Apple application runs the first script and sends a credential creating request to the server.

Step 213, the server receives the credential creating request sent by the first script, generates a second challenge code and sends the second challenge code to the first script.

For example, the second challenge code specifically is: h'571324588222EC79158F4250509ED2B16AE22F72550 5B89D25DC9E602895F25 6'.

Step 214, the first script receives the second challenge code sent by the server, takes a random number obtaining instruction as a parameter of a second user information and/or a parameter of a second server information required for calling the register interface, generates a second user information according to the parameter of the second user information, and generates a second server information according to the parameter of the second server information.

In an implementation, the parameter of the second user information includes a user ID parameter, a user icon parameter, a user name parameter and a user display name parameter; the taking the random number obtaining instruction as the parameter of the second user information and/or the parameter of the second server information required for calling the register interface specifically is: the first script takes the random number obtaining instruction as the user name parameter or the user display name parameter of the second user information.

In an implementation, the parameter of the second server information includes a server ID parameter and a server name parameter; the taking the random number obtaining instruction as the parameter of the second user information and/or the parameter of the second server information required for calling the register interface specifically is: the first script takes the random number obtaining instruction as the server name parameter of the second server information.

In an implementation, in a possible embodiment, before the taking the random number obtaining instruction as the parameter of the second user information and/or the parameter of the second server information required for calling the register interface, the method further includes: the first script obtains the random number obtaining instruction built in a browser.

In an implementation, in another possible embodiment, the taking the random number obtaining instruction as the parameter of the second user information and/or the parameter of the second server information required for calling the register interface further includes: the first script generates the random number obtaining instruction according to second user operation information.

Specifically, the first script generates the random number obtaining instruction according to the second user operation information specifically is: the first script executes a click method to display the second user operation interface, waits for receiving the second user operating information input by the user on a second user operation interface; when the first script receives the second user operation information, the first script generates the random number obtaining instruction according to the second user operation information.

Step 215, the first script obtains preset public key credential data, sets values of the first extension and a second key storing identification to preset values, transfers the second user information, the second server information, the second challenge code, the public key credential data, the set first extension and the set second key storing identification into the WebAuthn control of the Apple application.

Step 216, the Apple application encapsulates, according to a data format required for calling a preset register interface of the WebAuthn control, the second user information, the second server information, the second challenge code, the public key credential data, the set first extension and the set key storing identification that are transferred, to obtain a second register data, calls the register interface, transfers the second register data into the register interface, executes Step 217.

For example, the register interface specifically is: avigator.credentials.create(PublickeyCredentialCreationptions publicKey).

The random number obtaining instruction specifically is: "GetRandom8".

The second user information specifically is:
{"id":h'03AC674216F3E15C761EE1A5E255F06795 3623C8B388B4459 E13F978D7C846F4', "icon": "https://example.com/userIcon.png", "name": "GetRandom8", "displayName": "Command"}.

The second server information specifically is: {"id": "ftsafe@ftsafe.com", "name": "ftsafe✓ ftsafe.com"}.

The public key credential data specifically is: {"type": "public-key", "alg": −7}, in which, −7 is the signing algorithm identification, "public-key" is credential type.

In an implementation, Step 216 further includes: the register interface of the WebAuthn control generates the second register data according to the second user information, the second server information, the second challenge cod, the public key credential data, the first extension and the second key storing identification that are transferred, and sends the second register data to the Apple peripheral.

In an implementation, the second register data includes a second client data hash value, the second user information, the second server information, the public key credential data, the first extension and the second key storing identification.

For example, the second register data specifically is:
Publickey: {1:h'687134968222EC17202E42505F8 ED2B16AE22F16BB05 B88C25DB9E602645F141', 2: {"id": "ftsafe@ftsafe.com", "name": "ftsafe@ftsafe.com"}, 3: {"id": h'03AC674216F3E15C761EE1A5E255F0679 53623C8B388B4459E13F978D7C846F4', "icon": "https://example.com/userIcon.png", "name": "GetRandom8", "displayName": "Command"}, 4: [{"alg": −7, "type": "public-key"}], 6: {"attestation": "none"}, 7: {"rk":false}}.

Step 217, the Apple peripheral obtains the second user information, the second server information, the public key credential data, the first extension and the key storing identification from the received second register data, extracts a random number obtaining instruction from the second user information and/or the second server information.

Step 218, the Apple peripheral generates a first random number and takes the first random number as the second extension.

For example, the first random number specifically is: 313932F6D9323C42.

Step 219, the Apple peripheral sets the values of the device identification, the credential public key and the credential identification according to the values of the key storing identification and the first extension, encapsulates the set device identification, the set credential public key, the set credential identification and the second extension according to a format required for generating authentication data to obtain the second authentication data.

In an implementation, the value of the key storing identification specifically is false, the value of the first extension specifically is null; register data further includes: client data hash value.

Step 219 specifically is: the Apple peripheral generates a credential key pair and a first credential identification, obtains a preset device identification, respectively sets the values of the device identification, the credential public key and the credential identification which are required for generating the second authentication data to the first credential identification, the public key in the credential key pair and the preset device identification, and concatenates the set device identification, the set credential public key, the set credential identification and the second extension in sequence to obtain the second authentication data.

For example, the second authentication data specifically is:
h'E45329D03A2068D1CAF7F7BB0AE954E6B0E6259 745F32F4829F75
0F05011F9C2C5000007983E22415D7FDF4EA48A0 CDD60C4249B9D0060707875
A0708465A419F601E1E143D1F184674F916CF012 A825881AD6FB095EC3C13B9
79060DACA8632C43BCCC27E7FCFE190AB4B605 60DD7E51D542889FB1A51D
51261F03F9A1AAD2D7BD260F23232BB6A5B306 8E47D9541EB7169F78769D0D
8A5010203262001215820F3E75EE0D651BA5C780 DA97ADBD2EF8B019B4E5CE
80EDB7C5F97F0D79AFE8B112258207E1C3D1847 539BD045BE683CD8FFC3B8F
E5CC78F75DC345E8B4863C4B550CCCA313932F 6D9323C42'.

Step 220, the Apple peripheral sets the values of the signing result and the certificate chain according to the values of the key storing identification and the first extension, encapsulates the algorithm identification in the public key credential data, the set signing result and the set certificate chain according to a format for generating authentication statement to obtain a second authentication statement.

In an implementation, the value of the key storing identification specifically is false, the value of the first extension specifically is null.

Step 220 specifically is: the Apple peripheral uses a stored device private key to sign the client data hash value and the obtained authentication data to obtain a first signing result, obtains a device preset certificate chain, respectively sets the values of the public key credential data, the signing result and the certificate chain which are required for generating a second authentication statement to the public key credential data, the first signing result and the preset certificate chain in the register data, and concatenates the set public key credential data, the set signing result and the set certificate chain in sequence to obtain a second authentication statement.

For example, the signing algorithm identification specifically is: "alg": −7.

The preset signing result specifically is: "sig": h".
The preset certificate chain specifically is: "x5c": [h"].
The second authentication statement specifically is: {"alg": −7, "sig": h", "x5c": [h"]}.

Step 221, the Apple peripheral generates a second register response according to the preset authentication statement format, the second authentication data and the second authentication statement, returns the second register response back to the register interface.

For example, the preset authentication statement format is: 1: "packed".

The second register response specifically is: {1: "packed", 2:

h'E45329D03A2068D1CAF7F7BB0AE954E6B0E625974
5F32F4828F750F05011F9
C2C5000007983E22415D7FDF4EA48A0CDD60C4249B
9D0060707975A0708465
A419F601E1E143D1F184674F916CF012A825881AD6F
B095EC3C13B979060DA
CA8632C43BCCC27E7FCFE190AB4B60560DD7E51D5
42889FB1A51D51261F03
F9A1AAD2D7BD260F23232BB6A5B3068E47D9541EB
7169F78769D0D8A50102
0326200121582053E75EE0D651BA5C780DA97ADBD2
EF8B019B4E5C380EDB7
C5F97F0D79AFE8B112258207E1C3D1847539BD045BE
683CD8FFC3B8FE5CC78
F75DC345E8B4863C4B550CCCA313932F6D9323C42',
3: {"alg", −7, "sig": h", "x5c": [h"]}}.

In an implementation, after Step 221, the method further includes: the Webauthn sends the second register response returned by the register interface back to the first script.

Step 222, the first script parses the received second register response to obtain the preset authentication statement format, the second authentication data and the second authentication statement, extracts the first random number from the second extension and sends a response that obtaining the random number is successful to the Apple peripheral.

The present embodiment provides a method for communicating between an Apple mobile device and an Apple peripheral, which realizes that an Apple peripheral which does not support the External Accessory Framework protocol can communicate with an Apple mobile device.

Embodiment 3

Figure 3:
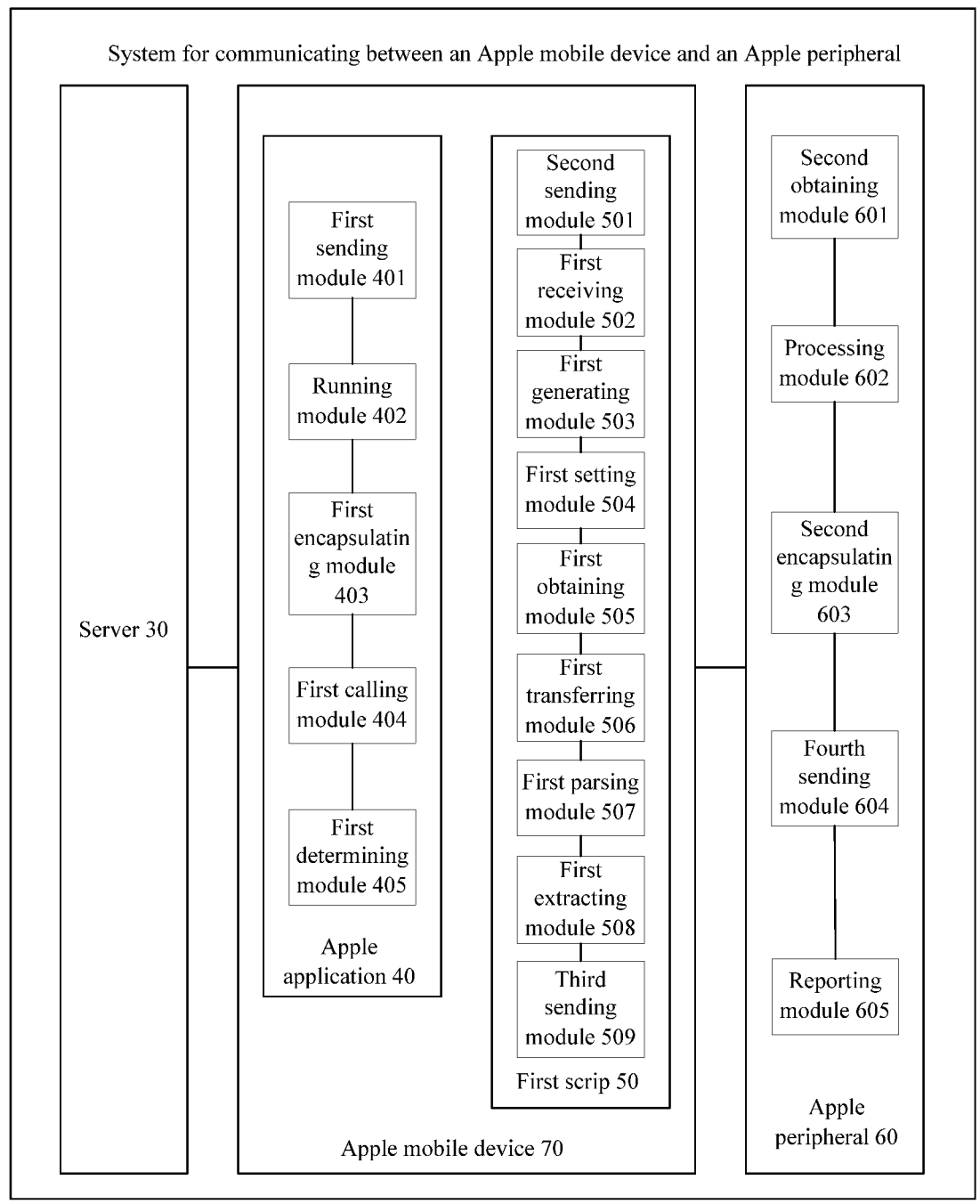
FIG. 3 is a module block diagram of a system for communicating between an Apple mobile device and an Apple peripheral provided by Embodiment 3 of the present application.

Embodiment 3 of the present application provides a system for communicating between an Apple mobile device and an Apple peripheral. As shown by FIG. 3, the system includes the Apple mobile device 70, the Apple peripheral 60 and a server 30, the Apple mobile device 70 on which a first script 50 is running includes an Apple application 40;

the Apple application 40 includes: a first sending module 401, a running module 402, a first encapsulating module 403, a first calling module 404 and a first determining module 405;

the first sending module 401 is configure to send a first preset webpage loading request to the server 30 according to first user operation information;

the running module 402 is configured to run the first script 50;

the first encapsulating module 403 is configured to encapsulate, according to a data format required for calling a preset register interface, user information, server information, a challenge code, public key credential data, a set first extension and a set key storing identification that are transferred to obtain register data;

the first calling module 404 is configured to call the register interface and transfer the register data into the register interface;

the first determining module 405 is configured to determine whether the Apple peripheral 60 is an authentication device according to a return value of the register interface;

the server 30 is configured to load a first preset webpage according to the received first preset webpage loading request; where the first preset webpage includes the first script 50;

the first script 50 includes: a second sending module 501, a first receiving module 502, a first generating module 503, a first setting module 504, a first obtaining module 505, a first transferring module 506, a first parsing module 507, a first extracting module 508 and a third sending module 509;

the second sending module 501 is configured to send a credential creating request to the server 30 when the first script is run by the running module 402;

the first receiving module 502 is configured to receive the challenge cod returned by the server 30;

the first generating module 503 is configured to, when the first receiving module 502 receives the challenge code returned by the server 30, take data to be processed as a parameter of user information and/or a parameter of server information, generate the user information according to the parameter of the user information, generate the server information according to the parameter of the server information;

the first setting module 504 is configured to set a value of a first extension and a value of a key storing identification to preset values;

the first obtaining module 505 is configured to obtain preset public key credential data;

the first transferring module 506 is configured to transfer the user information, the server information, the challenge code, the public key credential data, the set first extension and the set key storing identification into the Apple application 40;

the first parsing module 507 is configured to parse a received register response to obtain authentication data, parse the authentication data to obtain the second extension;

the first extracting module 508 is configured to extract a processing result from the second extension;

the third sending module 509 is configured to send the processing result to the Apple application;

the Apple peripheral 60 includes a second obtaining module 601, a processing module 602, a second encapsulating module 603 and a fourth sending module 604;

the second obtaining module 601 is configured to obtain the user information, the server information, the public key credential data, the first extension and the key storing identification from the received register data, and extract the data to be processed from the user information or the server information;

the processing module 602 is configured to perform preset processing on the data to be processed to obtain the processing result;

the second encapsulating module 603 is configured to generate the second extension according to the processing result, set a value of a response parameter required for generating the register response to a preset value according to the first extension and the key storing identification, encapsulate the second extension and the set response parameter according to a format required for generating authentication data to obtain a register response;

the fourth sending module 604 is configured to send the register response to the first script 50 via the preset register interface;

the Apple peripheral 60 further includes a reporting module 605;

the reporting module 605 is configured to report to the Apple application that a device type is authentication device when the Apple peripheral is plugged into the Apple mobile device.

In an implementation, the Apple application 40 further includes a built-in WebAuthn control; the first sending module 401 is specifically configured to call the WebAuthn control according to the first user operation information to send the first preset webpage loading request to the server 30.

In an implementation, the Apple application 40 further includes a built-in WebAuthn control, the WebAuthn control includes a register interface;

the first transferring module 506 is specifically configured to call the built-in WebAuthn control of the Apple application, and transfer the user information, the server information, the challenge code, the public key credential data, the set first extension and the set key storing identification into a preset register interface of the WebAuthn control.

In an implementation, the first determining module 405 specifically is configured to determine whether a parameter returned by the register interface is a first preset value, if yes, determine that the Apple peripheral 60 is the authentication device, otherwise, determine that the Apple peripheral 60 is not the authentication device.

In an implementation, the user information includes a user ID parameter, a user icon parameter, a user name parameter and a user display name parameter, and the server information includes a server ID parameter and a server name parameter;

the first generating module 503 is specifically configured to, when the first receiving module 502 receives a challenge code returned by the server 30, take the data to be processed as the user name parameter or the user display name parameter or the server name parameter, generate the user information according to the user ID parameter, the user icon parameter, the user name parameter and the user display name parameter, and generate the server information according to the server ID parameter and the server name parameter.

In an implementation, the first setting module 504 includes a first setting unit;

the first setting unit is configured to set the value of the first extension to none, set the value of the key storing identification to false;

the second encapsulating module 603 includes: a first treating unit, a second setting unit, a first encapsulating unit, a third setting unit, a second encapsulating unit and a third encapsulating unit;

the first treating unit is configured to take the processing result as the second extension;

the second setting unit is configured to set values of a device identification, a credential public key and a credential identification which are required for generating the authentication data to null;

the first encapsulating unit is configured to encapsulate the set device identification, the set credential public key and the set credential identification and the second extension according to f a format required for generating the authentication data to obtain the authentication data;

the third setting unit is configured to set values of a public key credential data, a signing result and a certificate chain which are required for generating an authentication statement to null;

the second encapsulating unit is configured to encapsulate the set public key credential data, the set signing result and the set certificate chain according to a format required for generating the authentication statement to obtain the authentication statement;

the third encapsulating unit is configured to encapsulate a preset authentication statement format, the authentication data and the authentication statement according to a format required for generating the register response to obtain the register response.

In an implementation, the first setting module 504 includes a fourth setting unit;

the fourth setting unit is configured to set the value of the first extension to null, and set the value of the key storing identification to false;

the register data further includes client data hash value;

the second encapsulating module 603 includes a second treating unit, a generating and obtaining unit, a fifth setting unit, a fourth encapsulating unit, a signing and obtaining unit, a sixth setting unit, a fifth encapsulating unit and a sixth encapsulating unit;

the second treating unit is configured to take the processing result as the second extension;

the generating and obtaining unit is configured to generate a credential key pair and a first credential identification, and obtain a preset device identification;

the fifth setting unit is configured to respectively set a value of a device identification, a value of a credential public key and a value of a credential identification which are required for generating the authentication data to the first credential identification, a public key in the credential key pair and the preset device identification;

the fourth encapsulating unit is configured to encapsulate the set device identification, the set credential public key, the set credential identification and the second extension according to a format required for generating the authentication data to obtain the authentication data;

the signing and obtaining unit is configured to use a stored device private key to sign the client data hash value and the obtained authentication data to obtain a first signing result, and obtain a device preset certificate chain;

the sixth setting unit is configured to respectively setting a value of public key credential data, a value of a signing result and a value of a certificate chain which are required for generating an authentication statement to the public key credential data, the first signing result and the preset certificate chain in the register data;

the fifth encapsulating unit is configured to encapsulate the set public key credential data, the set signing result and the set preset certificate chain according to a format required for generating the authentication statement to obtain the authentication statement;

the sixth encapsulating unit is configured to encapsulate a preset authentication statement format, the authentication data and the authentication statement according to a format required for generating the register response to generate the register response.

In an implementation, the fourth encapsulating unit is specifically configured to concatenate the set device identification, the set credential public key, the set credential identification and the second extension in sequence to obtain the authentication data;

the fifth encapsulating unit specifically is configured to concatenate the set public key credential data, the set signing result and the set certificate chain in sequence to obtain the authentication statement;

the sixth encapsulating unit specifically is configured to concatenate the preset authentication statement format, the authentication data and the authentication statement in sequence to obtain the register response.

In an implementation, the data to be processed specifically is a power-on instruction; the processing module 602 is specifically configured to generate a reset response according to the power-on instruction.

In an implementation, the data to be processed specifically is a random number obtaining instruction; the processing module 602 specifically is configured to generate a first random number according to the random number obtaining instruction.

In an optional embodiment, the present application further provides a system for communicating between an Apple mobile device and an Apple peripheral, including: the Apple mobile device, the Apple peripheral and a server, where the Apple mobile device on which a first script is running includes an Apple application;

the Apple mobile device includes a first transmitter and a first processor;

the first transmitter is configured to send a first preset webpage loading request to the server according to first user operation information;

the first processor is configured to run the first script;

the first processor is further configured to encapsulate, according to a data format required for calling a preset register interface, user information, server information, a challenge code, public key credential data, a set first extension and a set key storing identification that are transferred to obtain register data;

the first processor is further configured to call the register interface and transfer the register data into the register interface;

the first processor is further configured to determine whether the Apple peripheral is an authentication device according to a return value of the register interface;

the server is configured to load a first preset webpage according to the received first preset webpage loading request, where the first preset webpage includes the first script;

the first transmitter is further configured to send a credential creating request to the server when the first script is run by the first processor;

the Apple mobile device further includes a first receiver, configured to receive the challenge code returned by the server;

the first processor is further configured to, when the first receiver receives the challenge code returned by the server, take data to be processed as a parameter of user information and/or a parameter of server information, generate the user information according to the parameter of the user information, and generate the server information according to the parameter of the server information;

the first processor is further configured to set a value of a first extension and a value of a key storing identification to preset values;

the first processor is further configured to obtain preset public key credential data;

the first processor is further configured to transfer the user information, the server information, the challenge code, the public key credential data, the set first extension and the set key storing identification into the Apple application;

the first processor is further configured to parse a received register response to obtain authentication data, parse the authentication data to obtain a second extension;

the first processor is further configured to extract a processing result from the second extension;

the first processor is further configured to send the processing result to the Apple application;

the Apple peripheral includes a second receiver and a second processor;

the second receiver is configured to receive the register data;

the second processor is configured to obtain the user information, the server information, the public key credential data, the first extension and the key storing identification from the register data, and extract the data to be processed from the user information or the server information;

the second processor is further configured to perform preset processing on the data to be processed to obtain the processing result; the second processor is further configured to generate the second extension according to the processing result, set a value of a response parameter required for generating the register response to a preset value according to the first extension and the key storing identification, encapsulate the second extension and the set response parameter according to a format required for generating authentication data to obtain the register response;

the Apple peripheral further includes a second transmitter;

the second transmitter is configured to send the register response to the first script via running in the Apple mobile device the preset register interface; and the second transmitter is further configured to report to the Apple application that the Apple peripheral is the authentication device when the Apple peripheral is plugged into the Apple mobile device.

The system for communicating between an Apple mobile device and an Apple peripheral is used to implement any one of the aforementioned methods.

In an implementation, the Apple application further includes a built-in WebAuthn control; the first transmitter is specifically configured to call the WebAuthn control according to the first user operation information to send the first preset webpage loading request to the server.

In an implementation, the Apple application further includes a built-in WebAuthn control, the WebAuthn control includes a register interface;

the first processor is specifically configured to call the built-in WebAuthn control of the Apple application, and transfer the user information, the server information, the challenge code, the public key credential data, the set first extension and the set key storing identification into a preset register interface of the WebAuthn control.

In an implementation, the first processor is specifically configured to determine whether a parameter returned by the register interface is a first preset value, if yes, determine that the Apple peripheral is the authentication device, otherwise, determine that the Apple peripheral is not the authentication device.

In an implementation, the user information includes a user ID parameter, a user icon parameter, a user name parameter and a user display name parameter, and the server information includes a server ID parameter and a server name parameter;

the first processor is specifically configured to, when the first receiver receives the challenge code returned by the server, take the data to be processed as the user name parameter or the user display name parameter or the server name parameter, generate the user information according to the user ID parameter, the user icon parameter, the user name parameter and the user display name parameter, and generate the server information according to the server ID parameter and the server name parameter.

In an implementation, the first processor is specifically configured to:

set the value of the first extension to none, and set the value of the key storing identification to false;
the second processor is specifically configured to:
take the processing result as the second extension;
set values of a device identification, a credential public key and a credential identification which are required for generating the authentication data to null;
encapsulate the set device identification, the set credential public key and the set credential identification and the second extension according to a format required for generating the authentication data to obtain the authentication data;
set values of a public key credential data, a signing result and a certificate chain which are required for generating an authentication statement to null;
encapsulate the set public key credential data, the set signing result and the set certificate chain according to a format required for generating the authentication statement to obtain the authentication statement; and
encapsulate a preset authentication statement format, the authentication data and the authentication statement according to a format needed for generating the register response to obtain the register response.

In an implementation, the first processor is specifically configured to: set the value of the first extension to null, and set the value of the key storing identification to false;
the register data further includes a client data hash value;
the second processor is specifically configured to:
take the processing result as the second extension;
generate a credential key pair and a first credential identification and obtain a preset device identification;
respectively set a value of a device identification, a value of a credential public key and a value of a credential identification which are required for generating the authentication data to the first credential identification, a public key in the credential key pair and the preset device identification;
encapsulate the set device identification, the set credential public key, the set credential identification and the second extension according to a format required for generating the authentication data to obtain the authentication data;
use a stored device private key to sign the client data hash value and the obtained authentication data to obtain a first signing result, and obtain a device preset certificate chain;
respectively set a value of public key credential data, a value of a signing result and a value of a certificate chain which are required for generating an authentication statement to the public key credential data, the first signing result and the preset certificate chain in the register data;
encapsulate the set public key credential data, the set signing result and the set preset certificate chain according to a format required for generating the authentication statement to obtain the authentication statement; and
encapsulate a preset authentication statement format, the authentication data and the authentication statement according to a format required for generating the register response to generate the register response.

In an implementation, the second processor is specifically configured to:
concatenate the set device identification, the set credential public key, the set credential identification and the second extension in sequence to obtain the authentication data;
concatenate the set public key credential data, the set signing result and the set certificate chain in sequence to obtain the authentication statement; and
concatenate the preset authentication statement format, the authentication data and the authentication statement in sequence to obtain the register response.

In an implementation, the data to be processed specifically is a power-on instruction; the second processor is specifically configured to generate a reset response according to the power-on instruction.

In an implementation, the data to be processed specifically is a random number obtaining instruction; the second processor is specifically configured to generate a first random number according to the random number obtaining instruction.

The present embodiment provides a system for communicating between an Apple mobile device and an Apple peripheral, which realizes that an Apple peripheral which does not support the External Accessory Framework protocol can communicate with an Apple mobile device.

The above descriptions are only preferred specific embodiments of the present application, but the protection scope of the present application is not limited thereto. Any changes or substitutions that can be easily conceived by those skilled in the art within the technical scope disclosed in the present application should be included in the protection scope of the present application. Therefore, the protection scope of the present application should be subject to the protection scope of the claims

The invention claimed is:

1. A method for communicating between an Apple mobile device and an Apple peripheral, which is applied in a system comprising the Apple mobile device, the Apple peripheral, and a server, wherein the Apple mobile device on which a first script is running comprises an Apple application, and the method comprises the following steps:
Step 101, sending, by the Apple application, a first preset webpage loading request to the server according to first user operation information;
Step 102, loading, by the server, a first preset webpage for the Apple application according to the first preset webpage loading request, wherein the first preset webpage comprises the first script;
Step 103, running, by the Apple application, the first script and sending a credential creating request to the server, when the first script receives a challenge code returned by the server, retrieving data to be processed as a parameter of user information and/or a parameter of server information, generating the user information according to the parameter of the user information, generating the server information according to the parameter of the server information, setting a value of a first extension and a value of a key storing identification to preset values, and obtaining preset public key credential data;
Step 104, transferring, by the first script, the user information, the server information, the challenge code, the public key credential data, the set first extension and the set key storing identification into the Apple application;
Step 105, encapsulating, according to a data format required for calling a preset register interface, by the Apple application, the user information, the server information, the challenge code, the public key credential data, the set first extension and the set key storing identification that are transferred, to obtain register data, calling the register interface, transferring the register data into the register interface, and determining whether the Apple peripheral is an authentication device according to a return value of the register interface, when yes, executing Step 106, when no, ending the procedure;

Step 106, obtaining, by the Apple peripheral, the user information, the server information, the public key credential data, the first extension and the key storing identification from the register data, and extracting the data to be processed from the user information or the server information;

Step 107, performing, by the Apple peripheral, preset processing on the data to be processed to obtain a processing result, generating a second extension according to the processing result, setting a value of a response parameter required for generating a register response to a preset value according to the first extension and the key storing identification, encapsulating the second extension and the set response parameter according to a format required for generating authentication data to obtain a register response, and sending the register response to the first script via the preset register interface;

Step 108, parsing, by the first script, the register response to obtain authentication data, parsing the authentication data to obtain the second extension, extracting the processing result from the second extension, and sending the processing result to the Apple application; and the method further comprises: reporting, by the Apple peripheral, to the Apple application that the Apple peripheral is the authentication device when the Apple peripheral is plugged into the Apple mobile device.

2. The method of claim 1, wherein Step 101 further comprises: calling, by the Apple application, a built-in WebAuthn control according to the first user operation information to send the first preset webpage loading request to the server.

3. The method of claim 1, wherein Step 104 further comprises: calling, by the first script, a built-in WebAuthn control of the Apple application, and transferring the user information, the server information, the challenge code, the public key credential data, the set first extension and the set key storing identification into a preset register interface of the WebAuthn control.

4. The method of claim 1, wherein determining whether the Apple peripheral is the authentication device according to the return value of the register interface in Step 105 further comprises: determining, by the Apple application, whether a parameter returned by the register interface is a first preset value, when yes, determining that the Apple peripheral is the authentication device, otherwise, determining that the Apple peripheral is not the authentication device.

5. The method of claim 1, wherein the user information comprises a user identity (ID) parameter, a user icon parameter, a user name parameter and a user display name parameter, and the server information comprises a server ID parameter and a server name parameter; and retrieving the data to be processed as the parameter of the user information and/or the parameter of the server information, generating the user information according to the parameter of the user information, and generating the server information according to the parameter of the server information in Step 103 further comprises: taking, by the first script, the data to be processed as the user name parameter or the user display name parameter or the server name parameter, generating the user information according to the user ID parameter, the user icon parameter, the user name parameter and the user display name parameter, and generating the server information according to the server ID parameter and the server name parameter.

6. The method of claim 1, wherein setting the value of the first extension and the value of the key storing identification to the preset values in Step 103 further comprises: setting, by the first script, the value of the first extension to none and setting the value of the key storing identification to false; and generating the second extension according to the processing result, setting the value of the response parameter required for generating the register response to the preset value according to the first extension and the key storing identification, and encapsulating the second extension and the set response parameter according to the format required for generating the authentication data to obtain the register response in Step 107 further comprises:

Step b1, taking, by the Apple peripheral, the processing result as the second extension;

Step b2, setting, by the Apple peripheral, values of a device identification, a credential public key and a credential identification which are required for generating the authentication data to null, encapsulates the set device identification, the set credential public key, the set credential identification and the second extension according to a format required for generating the authentication data to obtain the authentication data;

Step b3, setting, by the Apple peripheral, values of a public key credential data, a signing result and a certificate chain which are required for generating an authentication statement to null, encapsulating the set public key credential data, the set signing result and the set certificate chain according to a format required for generating the authentication statement to obtain the authentication statement; and Step b4, encapsulating, by the Apple peripheral, a preset authentication statement format, the authentication data and the authentication statement according to a format required for generating the register response to obtain the register response.

7. The method of claim 1, wherein the setting the value of the first extension and the value of the key storing identification to preset values in Step 103 further comprises: setting, by the first script, the value of the first extension to null, and setting the value of the key storing identification to false, and the register data further comprises a client data hash value; and generating the second extension according to the processing result, setting the value of the response parameter required for generating the register response to the preset value according to the first extension and the key storing identification, and encapsulating the second extension and the set response parameter according to the format required for generating the authentication data to obtain the register response in Step 107 further comprises:

Step c1, taking, by the Apple peripheral, the processing result as the second extension;

Step c2, generating, by the Apple peripheral, a credential key pair and a first credential identification, obtaining a preset device identification, respectively setting a value of a device identification, a value of a credential public key and a value of a credential identification which are required for generating the authentication data to the first credential identification, a public key in the credential key pair and the preset device identification, and encapsulating the set device identification, the set credential public key, the set credential identification and the second extension according to a format required for generating the authentication data to obtain the authentication data;

Step c3, using, by the Apple peripheral, a stored device private key to sign the client data hash value and the obtained authentication data to obtain a first signing result, obtaining a device preset certificate chain, respectively setting a value of public key credential data, a value of a signing result and a value of a certificate chain which are required for generating an authentication statement to the public key credential data, the first signing result and the preset certificate chain in the register data, and encapsulating the set public key credential data, the set signing result and the set preset certificate chain according to a format required for generating the authentication statement to obtain the authentication statement; and Step c4, encapsulating, by the Apple peripheral, a preset authentication statement format, the authentication data and the authentication statement according to a format required for generating the register response to generate the register response.

8. The method of claim 7, wherein encapsulating the set device identification, the set credential public key, the set credential identification and the second extension according to the format required for generating the authentication data to obtain the authentication data further comprises: concatenating, by the Apple peripheral, the set device identification, the set credential public key, the set credential identification and the second extension in sequence to obtain the authentication data;

encapsulating the set public key credential data, the set signing result and the set preset certificate chain according to the format required for generating the authentication statement to obtain the authentication statement further comprises: concatenating, by the Apple peripheral, the set public key credential data, the set signing result and the set certificate chain in sequence to obtain the authentication statement; and encapsulating, by the Apple peripheral, the preset authentication statement format, the authentication data and the authentication statement according to the format required for generating the register response to generate the register response further comprises: concatenating, by the Apple peripheral, the preset authentication statement format, the authentication data and the authentication statement in sequence to obtain the register response.

9. The method of claim 1, wherein the data to be processed is a power-on instruction; and performing, by the Apple peripheral, the preset processing on the data to be processed to obtain the processing result in Step 107 further comprises: generating, by the Apple peripheral, a reset response according to the power-on instruction.

10. The method of claim 1, wherein the data to be processed further comprises a random number obtaining instruction; and performing, by the Apple peripheral, the preset processing on the data to be processed to obtain the processing result in Step 107 further comprises: generating, by the Apple peripheral, a first random number according to the random number obtaining instruction.

11. A system for communicating between an Apple mobile device and an Apple peripheral, comprising: the Apple mobile device, the Apple peripheral and a server, wherein the Apple mobile device on which a first script is running comprises an Apple application;

the Apple mobile device comprises a first transmitter and a first processor;

the first transmitter is configured to send a first preset webpage loading request to the server according to first user operation information;

the first processor is configured to run the first script;

the first processor is further configured to encapsulate, according to a data format required for calling a preset register interface, user information, server information, a challenge code, public key credential data, a set first extension and a set key storing identification that are transferred to obtain register data;

the first processor is further configured to call the register interface and transfer the register data into the register interface;

the first processor is further configured to determine whether the Apple peripheral is an authentication device according to a return value of the register interface;

the server is configured to load a first preset webpage according to the first preset webpage loading request, wherein the first preset webpage comprises the first script;

the first transmitter is further configured to send a credential creating request to the server when the first script is run by the first processor;

the Apple mobile device further comprises a first receiver, configured to receive the challenge code returned by the server;

the first processor is further configured to, when the first receiver receives the challenge code returned by the server, retrieve data to be processed as a parameter of user information and/or a parameter of server information, generate the user information according to the parameter of the user information, and generate the server information according to the parameter of the server information;

the first processor is further configured to set a value of a first extension and a value of a key storing identification to preset values;

the first processor is further configured to obtain preset public key credential data;

the first processor is further configured to transfer the user information, the server information, the challenge code, the public key credential data, the set first extension and the set key storing identification into the Apple application;

the first processor is further configured to parse a received register response to obtain authentication data, parse the authentication data to obtain a second extension;

the first processor is further configured to extract a processing result from the second extension;

the first processor is further configured to send the processing result to the Apple application;

the Apple peripheral comprises a second receiver and a second processor;

the second receiver is configured to receive the register data;

the second processor is configured to obtain the user information, the server information, the public key credential data, the first extension and the key storing identification from the register data, and extract the data to be processed from the user information or the server information;

the second processor is further configured to perform preset processing on the data to be processed to obtain the processing result;

the second processor is further configured to generate the second extension according to the processing result, set a value of a response parameter required for generating the register response to a preset value according to the first extension and the key storing identification, encapsulate the second extension and the set response parameter according to a format required for generating authentication data to obtain the register response;
the Apple peripheral further comprises a second transmitter;
the second transmitter is configured to send the register response to the first script running in the Apple mobile device via the preset register interface; and
the second transmitter is further configured to report to the Apple application that the Apple peripheral is the authentication device when the Apple peripheral is plugged into the Apple mobile device.

12. The system of claim 11, wherein the Apple application further comprises a built-in WebAuthn control; the first transmitter is configured to call the WebAuthn control according to the first user operation information to send the first preset webpage loading request to the server.

13. The system of claim 11, wherein the Apple application further comprises a built-in WebAuthn control, the WebAuthn control comprises a register interface; and
the first processor is configured to call the built-in WebAuthn control of the Apple application, and transfer the user information, the server information, the challenge code, the public key credential data, the set first extension and the set key storing identification into a preset register interface of the WebAuthn control.

14. The system of claim 11, wherein the first processor is configured to determine whether a parameter returned by the register interface is a first preset value, when yes, determine that the Apple peripheral is the authentication device, otherwise, determine that the Apple peripheral is not the authentication device.

15. The system of claim 11, wherein the user information comprises a user identity (ID) parameter, a user icon parameter, a user name parameter and a user display name parameter, and the server information comprises a server ID parameter and a server name parameter; and
the first processor is configured to, when the first receiver receives the challenge code returned by the server, take the data to be processed as the user name parameter or the user display name parameter or the server name parameter, generate the user information according to the user ID parameter, the user icon parameter, the user name parameter and the user display name parameter, and generate the server information according to the server ID parameter and the server name parameter.

16. The system of claim 11, wherein the first processor is configured to:
set the value of the first extension to none, and set the value of the key storing identification to false;
the second processor is configured to:
take the processing result as the second extension;
set values of a device identification, a credential public key and a credential identification which are required for generating the authentication data to null;
encapsulate the set device identification, the set credential public key and the set credential identification and the second extension according to a format required for generating the authentication data to obtain the authentication data;
set values of a public key credential data, a signing result and a certificate chain which are required for generating an authentication statement to null;
encapsulate the set public key credential data, the set signing result and the set certificate chain according to a format required for generating the authentication statement to obtain the authentication statement; and
encapsulate a preset authentication statement format, the authentication data and the authentication statement according to a format needed for generating the register response to obtain the register response.

17. The system of claim 11, wherein the first processor is configured to: set the value of the first extension to null, and set the value of the key storing identification to false;
the register data further comprises a client data hash value;
the second processor is configured to:
take the processing result as the second extension;
generate a credential key pair and a first credential identification and obtain a preset device identification;
respectively set a value of a device identification, a value of a credential public key and a value of a credential identification which are required for generating the authentication data to the first credential identification, a public key in the credential key pair and the preset device identification;
encapsulate the set device identification, the set credential public key, the set credential identification and the second extension according to a format required for generating the authentication data to obtain the authentication data;
use a stored device private key to sign the client data hash value and the obtained authentication data to obtain a first signing result, and obtain a device preset certificate chain;
respectively set a value of public key credential data, a value of a signing result and a value of a certificate chain which are required for generating an authentication statement to the public key credential data, the first signing result and the preset certificate chain in the register data;
encapsulate the set public key credential data, the set signing result and the set preset certificate chain according to a format required for generating the authentication statement to obtain the authentication statement; and
encapsulate a preset authentication statement format, the authentication data and the authentication statement according to a format required for generating the register response to generate the register response.

18. The system of claim 17, wherein the second processor is configured to:
concatenate the set device identification, the set credential public key, the set credential identification and the second extension in sequence to obtain the authentication data;
concatenate the set public key credential data, the set signing result and the set certificate chain in sequence to obtain the authentication statement; and
concatenate the preset authentication statement format, the authentication data and the authentication statement in sequence to obtain the register response.

19. The system of claim 11, wherein the data to be processed is a power-on instruction; and the second processor is configured to generate a reset response according to the power-on instruction.

20. The system of claim 11, wherein the data to be processed is a random number obtaining instruction; the second processor is configured to generate a first random number according to the random number obtaining instruction.

* * * * *